US 7,606,814 B2

(12) United States Patent
Deily et al.

(10) Patent No.: US 7,606,814 B2
(45) Date of Patent: *Oct. 20, 2009

(54) TRACING A WEB REQUEST THROUGH A WEB SERVER

(75) Inventors: Eric D. Deily, Issaquah, WA (US); Ming Lu, Redmond, WA (US); Gabriele Giuseppini, Redmond, WA (US); Melur Raghuraman, Sammamish, WA (US); Jaroslav Dunajsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 116 days.

This patent is subject to a terminal disclaimer.

(21) Appl. No.: 10/798,819

(22) Filed: Mar. 11, 2004

(65) Prior Publication Data

US 2005/0203952 A1 Sep. 15, 2005

(51) Int. Cl.
*G06F 7/00* (2006.01)
*G06F 17/00* (2006.01)
*G06F 11/00* (2006.01)
*G06F 9/44* (2006.01)
*G06F 15/173* (2006.01)

(52) U.S. Cl. .................. 707/101; 707/100; 714/45; 717/124; 717/128; 709/224

(58) Field of Classification Search .............. 707/10, 707/3, 4, 104.1, 1, 100, 101; 709/224; 717/124, 717/128; 714/45

See application file for complete search history.

(56) References Cited

U.S. PATENT DOCUMENTS 6,157,927 A * 12/2000 Schaefer et al. ......... 707/103 R

OTHER PUBLICATIONS

Microsoft, Tracing Overview, copyright 2002, pp. 1-8.*
forums.apress.com, Web Development/design, Aug. 2003, pp. 1-10.*
Lumigent, "Log Explorer Walkthrough" Aug. 2002, www.lumigent. com, pp. 1-20.*
Foster, James, "Tracing in ASP.NET" Jan. 1, 2002, DotNetCoders <http://www.dotnetcoders.com/web/Articles/ShowArticle. aspx?article 26>, p. 1-3.*
Lee, Wei-Meng, "Debugging ASP.NET" Sep. 22, 2003, ONDotnet, <http://www.ondotnet.com/pub/a/dotnet/2003/09/22/debugaspnet. html>, p. 1-5.*
Duthie, Andrew G, "Microsoft ASP.NET Programming with Visual Basic .NET Version 2003 Step by Step" Apr. 23, 2003, Microsoft Press, p. 1-3 and p. 1-8.*

* cited by examiner

*Primary Examiner*—Apu M Mofiz
*Assistant Examiner*—Brent Stace
(74) *Attorney, Agent, or Firm*—Lee & Hayes, PLLC (57) ABSTRACT

A method of tracing data on a network for a Web request that detects events of the Web request as the Web request is serviced. The method provides a unique identifier (ID) for the Web request. The ID is associated with all events for the Web request in a trace log. When such events occur in the servicing of the Web request, each event is recorded with the ID of the Web request in a trace log. The trace log can be accessed via the ID to debug a Web request service failure.

31 Claims, 5 Drawing Sheets

TRACING A WEB REQUEST THROUGH A WEB SERVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to event tracing and more particularly to a method of tracing a Web request through a Web server.

BACKGROUND

In the client/server World Wide Web of Internet computing that we live in today, increasing numbers of Web based applications are being developed—an example of which is electronic commerce (e-commerce) or 'business on the Web'. A Web based application includes the functionality of a Web server servicing a request received through the Web from a client (i.e., a Web request). The development of Web based applications includes the task of finding errors in programming code, often referred to as 'debugging' a computer program. Errors in programming code can also show up when a Web server services a Web request received through the Web from a client.

Common issues in debugging Web applications include finding out what is happening with a client system and what is happening with a Web application running on the client system. In order to diagnose issues on servers and clients, such as performance on a Web request and/or issues of a failed Web request, no easy way exists to figure out what's going on while a Web request is being processed. One way to diagnose such issues is to trigger a dump of the right processes at the right time. Then, after the often quite large dump has been retrieved, a review of the contents of one or more files of the dump is needed to find one or more sources of a poor request performance or of a Web request failure. This dump review process can require highly skilled diagnostic personnel in order to be performed properly and it may be quite difficult for skilled diagnostic personnel to find the source of the failed Web request. Moreover, evidence of a poor request performance or of a Web request failure might not even be in the dump since more often than not the dump will be triggered at a time when the client and the server are properly operating.

Another common problem in debugging Web requests is figuring out where performance issues arise on specific kinds of Web requests. For instance, diagnosis that is global across an entire server so as to hit all Web requests is not granular enough to be practical. If a particular kind of Web request has severe latency problems and that Web request involves a plurality of installed filters, it may be necessary to review a dump reporting on all of the filters in order to find out that a problem is arising with only one of the installed filters. Alternatively, it may be necessary to enable one filter at a time and perform successive individual tests for each of the installed filters to find out if a problem is arising with only one of the installed filters. These types of problem resolution efforts can be time consuming.

Still another common problem in debugging Web requests is figuring out why a specific Web request stops being serviced (e.g., 'hangs'). Again, this may require the triggering of a dump and reviewing content of the dump files, where the dump was hopefully triggered at an appropriate time to include evidence of Web request servicing errors. Even then, the right amount of information in the dump files may be insufficient for a proper diagnosis or may be too verbose to be practical for debugging any one of several Web requests that are reflected in the dump files. Yet another problem with debugging some Web requests is that, in order to perform a proper debugging analysis, the specific Web request must not 'hang' but must continue on to completion of the Web request before all of the events for that Web request are stored and accessible for diagnostic analysis.

One source of problems in debugging Web request problems is that operating personnel may just cancel a Web request hosting process when a Web request servicing problem occurs. Unfortunately, this can remove any trace or evidence needed for a proper diagnosis of the Web request servicing problem.

Another type of difficulty in Web request servicing problem diagnosis is when code does not stop executing as soon as a bug occurs and the bug occurs without any error being signaled. As a result, the 'bug' is not noticed until long after the bug has occurred. Then, diagnostic personnel must undertake the often difficult task of finding how and where the bug occurred during execution of the code—such as by sifting through a voluminous amount of data in one or more dump files.

It would be an advance in the art to document (e.g., create a 'trace' for) a Web request as it proceeds throughout an entire servicing of the Web request, or a specifically identified portion thereof, by a Web server. The trace can then be used to easily identify one or more sources of a Web request servicing problem—thereby increasing the probability of having an easily reproducible test case that can be used in debugging by a software developer or by diagnostic personnel.

SUMMARY

In one implementation, a demand can be made for a trace of identified key execution events as they happen for a Web request that being serviced by a Web server. These events can be correlated to a unique Web request identifier (ID) for each Web request. Thus, every happening or event that is traced during the execution of a Web request will be associated with the unique Web request ID. This unique Web request ID can be positioned, for convenience and ease of reference, so as to be the first piece of user data in a trace entry or record that is associated with the Web request. An application can then use the unique Web request ID to access a log file that contains all entries or records that trace all of the events that happen during the servicing of the Web request. This access to the trace in the log file allows the application to produce a report on the identified key execution events that happened for the Web request as the Web request makes its way through the Web server.

In other implementations, an application program interface is exposed for Web based applications that make Web requests, such as electronic commercial (e-commerce) applications. These Web based applications can then obtain the unique Web request ID. Once obtained, a Web based application can correlate its own events with the events of the Web server in servicing Web requests from the Web based application.

BRIEF DESCRIPTION OF THE DRAWINGS

A more complete understanding of the implementations may be had by reference to the following detailed description when taken in conjunction with the accompanying drawings wherein.

The same numbers are used throughout the disclosure and figures to reference like components and features. Series 100 numbers refer to features originally found in FIG. 1, series 200 numbers refer to features originally found in FIG. 2, and series 300 numbers refer to features originally found in FIG. 3, and so on.

DETAILED DESCRIPTION

A Web request event tracing tool, in various implementations, provides an environment for a system to diagnose problems with Web request processing of Web applications. A tracing mechanism is provided by the tool that allows for all execution events that happen during the processing of a Web request to be tied back together for that single Web request. The events that are tracked for a Web request can be those that occur through a unit of work, an activity, or any other kind of recognized event that can happen.

An operating system for a server can include the Web request event tracing tool. The tool can be maintained by the operating system, where the operating system has a trace logger that can accept data from both kernel mode device drivers and user mode applications. All functionality of the Web request event tracing tool, however, need not be provided by the operating system but can also be provided, either in whole or in part, by an application that works in conjunction with the operating system of the server.

Figure 1:
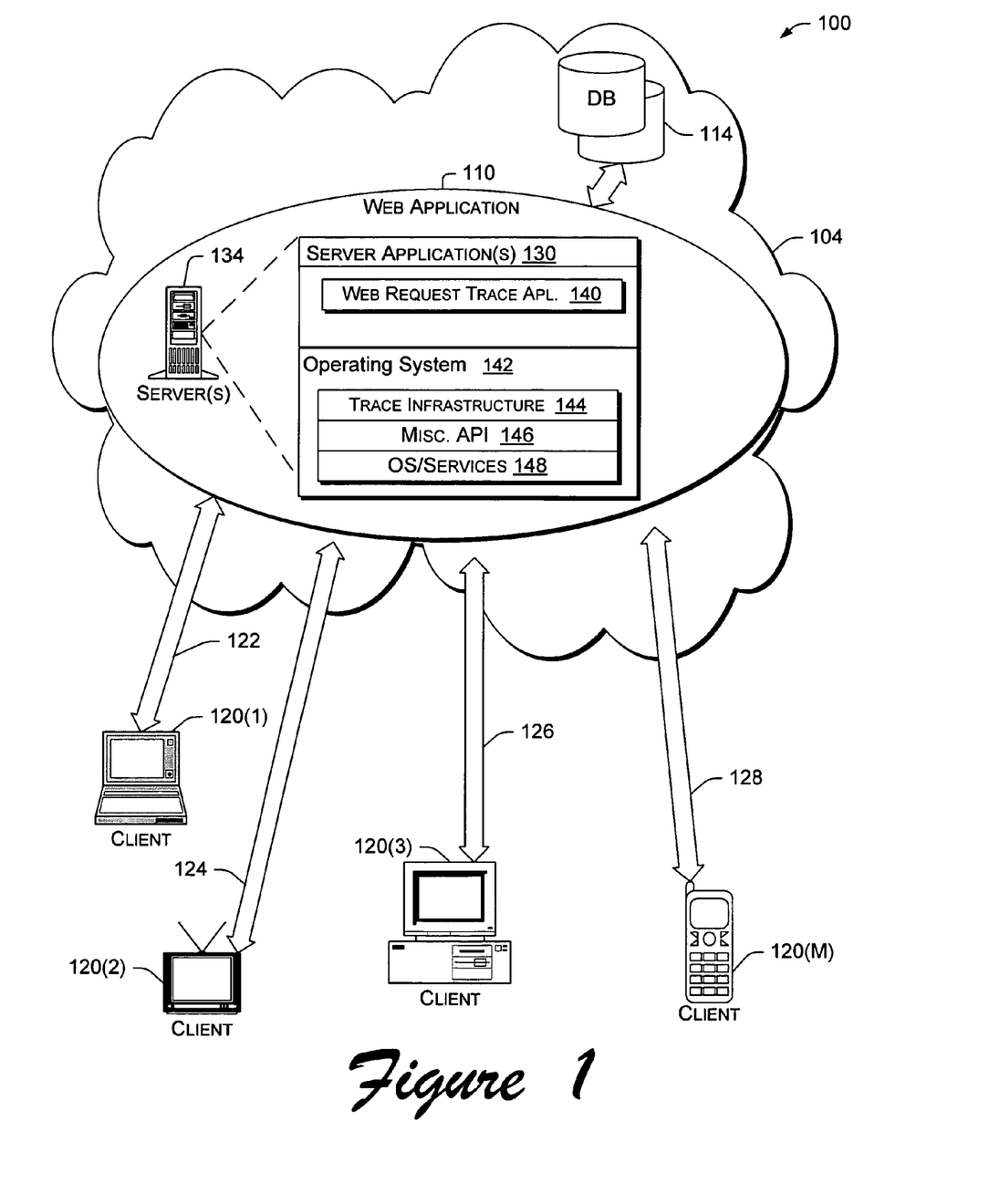
FIG. 1 illustrates a network architecture in which clients access Web services provided by one of more servers over the Internet using conventional protocols, where each server runs a server process that can access one or more databases.

A network environment 100 is depicted in FIG. 1. Network environment 100 includes a plurality of different kinds of clients 120 (1-M) that access Web services provided by one of more servers 134 over the Internet using conventional protocols. Each server 134 runs a server process that can access one or more databases 114. Each server 134 can operate a Web request event tracing tool via its operating system or, either in whole or in part, via one or more server applications 130 that work in conjunction with the operating system of the server 134.

The network environment 100 includes representative Web services accessible directly by a software application, such as Web application 110. Each Web service is illustrated as including one or more servers 134 that execute software to handle requests for particular services. Such services often maintain databases 114 that store information to be served back to requesters. For instance, databases 114 can include an object-oriented database. Web services may be configured to perform any one of a variety of different services and can be combined with each other and with other applications to build intelligent interactive experiences.

The network environment 100 also includes representative client devices 120(1), 120(2), 120(3), ..., 120(M) that utilize the Web application 110 (as represented by communication links 122-128). The client devices, referenced generally as number 120, can be implemented many different ways. Examples of possible client implementations include, without limitation, portable computers, stationary computers, tablet PCs, televisions/set-top boxes, wireless communication devices such as cellular telephones, personal digital assistants, video gaming consoles, printers, photocopiers, and other smart devices.

The Web application 110 is an application designed to handle and service requests from clients 120. The Web application 110 is composed of one or more server applications 130 that are executing on one or more servers 134 or other computer systems. A portion of Web application 110 may actually reside on one or more of clients 120. Alternatively, Web application 110 may coordinate with other software on clients 120 to actually accomplish its tasks.

Each server 134 has an operating system 142. Each operating system can have a trace infrastructure 144 that includes a Web request event tracing tool. Alternatively, the Web request event tracing tool can also be provided, either in whole or in part, by a Web request trace application 140 that works in conjunction with the operating system 142 of the server 134.

The operating system 142 of each server 134 has an application program interface (API) layer 146 and an operating system/services layer 148. The API layer 146 presents groups of functions that the server applications 130 can call to access the resources and services provided by layer 146. An application residing on client 120 can also use the API functions by making calls directly, or indirectly, to the API layer 146 over the network 104.

As part of the functionality provided by the Web request event tracing tool, a "trace context" is obtained for a Web request. The tool then uses that trace context in the events that happened during the servicing of the Web request so as to be able to correlate trace events from one or more applications that interface with a server that services the Web request as well as with events in the server. By way of example, an exemplary trace context for a Web request is a Globally Unique Identifier (GUID) that is associated with the Web request. Each event that happens during the servicing of the Web request is then associated with the Web request GUID. As the event happens, the event is logged with the Web request GUID in a log file that traces the servicing of the Web request. Thus, every event that happens when the Web request is serviced is traced during the execution of the Web request so as to be associated with the Web request GUID. The Web request GUID is used in implementations of the Web request event tracing tool to track the events for a Web request as it is serviced both at a server as well as when the server accesses additional information, such as by way of a database access. In order to be unique the Web request GUID can be constructed, for instance, as a conventional 128 bit GUID.

Each entry in the log file for each event can include, in addition to the Web request GUID, a variety of other information. This information can be specific to the type of event that is being logged. For instance, the entry can include the kernel mode time, the user mode processor time, a process identifier (ID), a thread ID, etc. Each process incident to servicing a Web request can be logged with various information: an image filename that the process was running; a Web request send; etc. The Web request GUID can be positioned, for convenience and ease of use, so as to be the first piece of user data in the trace that is associated with the Web request in a log file.

Figure 2:
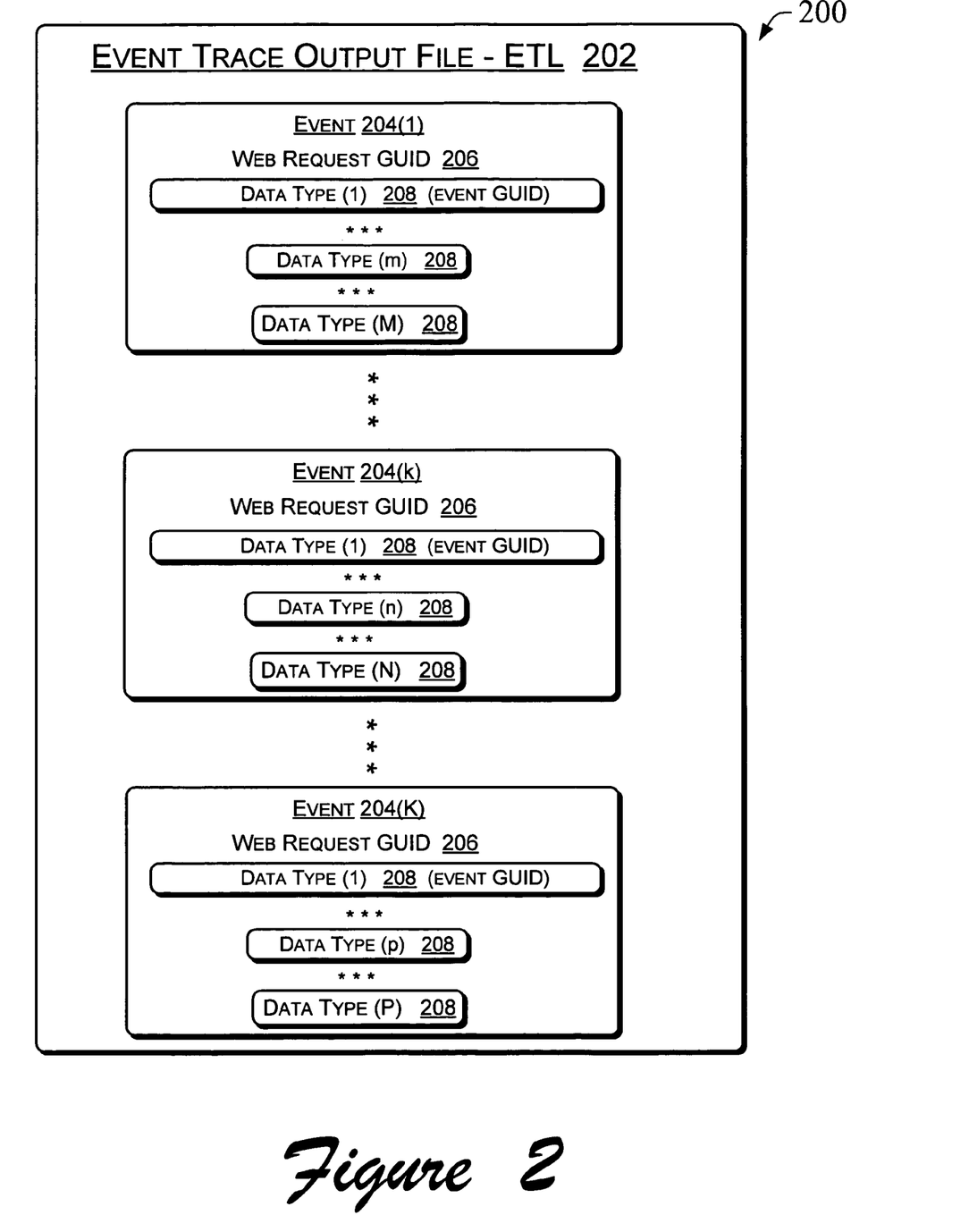
FIG. 2 illustrates an exemplary embodiment of an event trace output file, or a event trace log file.

An exemplary embodiment of an event trace output file (e.g., an event trace log file) 202 is illustrated in FIG. 2. File 202 can be one or more event trace log files in an environment 200. For instance environment 200 can be within the one or more databases 114 seen in FIG. 1, where each server 134 runs a server process that can access the one or more databases 114 for the purpose of interacting with the one or more event trace log files 202. Note that the databases 114 can be remote from any server 134 and that trace events can be published to a remote location by the server 134.

Event trace log file 202 can contain a plurality of entries. Each entry represents an event 204 (*k*), where k is an integer from 1 to K. Event 204 (*k*) is logged into trace log file 202 as it occurs during the processing of a Web request by server 134. A Web request GUID 206 is associated with the Web request by a trace infrastructure, such as by Web request trace application 148 or by trace infrastructure 144. Each event 204(*k*) is logged with the Web request GUID 206 that corresponds to the Web request within which the event occurred. Along with the Web request GUID 206 for the particular Web request, one or more data types 208 are included with each entry in the log file 202. Each data type 208 can include a different kind of data that can be descriptive of that particular event 204(*k*) that occurred during the processing of the Web request to which the Web request GUID 206 has been assigned. The number of data types 208 for an event 204(*k*) can depend upon a specified level of verbosity that is to be logged for the particular event. Each event 204 has a corresponding 'event GUID', for instance, Data Type (1) 208. As such, there is one (1) event GUID 208 for each event 204 and there is one (1) Web request GUID 206 for each Web request.

A consumer application can use the unique Web request ID (e.g., the GUID) to access the first piece of user data in the trace within the log file which, as previously described, is where the Web request GUID can be stored. Since the log file contains the trace of all the events that happened for the Web request, this access to the trace in the log file by the application allows the application to produce a report on identified key execution events that happened as the Web request makes its way through one or more processes that are performed as the Web request is being serviced by the Web server. The report is based upon the Web request GUID that is associated with the Web request. The application that generates the report uses the Web request GUID to put back together or reconstruct which events happened as those events are reflected in a trace log file for a traced process.

In an exemplary Web request server environment, multiple logger streams may be active at one time, typically one for a kernel logger and one for each trace-enabled application that is running on the server. The trace from multiple logger streams can be processed and returned to a caller one event at a time. By way of example, the caller can be a trace-enabled application that is running on the server. The application can access the logger streams to a trace for a Web request that is being logged in a log file. The application can retrieve information about the servicing of a Web request from the log file and can then use this information to produce a report. The report can be used to find a source of a problem that is related to an event that happened during the servicing of a Web request.

The functionality of the Web request event tracing tool can be applied to any Web based application. The Web based application can make use of an event tracing mechanism to do Web request tracing which is available to all tracing entities. The event tracing mechanism generates traces events for events that happen during the course of servicing of a Web request. The functionality of the Web request event tracing tool can obtain and/or generate a Web request GUID for a Web request. The tool then associates the Web request GUID with events that happen during the servicing of the Web request. As events happen during the servicing of the Web request, an entry can be made for each event in a log file. Note also that each event has an event GUID that is entered into the entry for that event in the log file. Each entry corresponding to the servicing of the Web request that is logged in the log file will be associated with the Web request GUID. A trace-enabled application that is running on the server that is servicing the Web request can then use the Web request GUID to access the log file. Alternatively, events in the log file can be sorted or otherwise grouped according to their respective Web request GUIDs in order to find out what events were logged for each Web request. In either case, a diagnosis can be made of problems that happened when the Web request was being serviced. This diagnosis finds a correlation between the trace events that occur when the Web application interfaces with the server and the trace events that occur within the server itself as it services the Web request. As such, implementations provide diagnosability when problems happen during the processing of the Web request. Such implementations thereby obviate the need to create or generate a process dump for review and stack analysis when a problem happens during the processing of the Web request. This diagnosability is provided by implementations of request-based tracing where a Web request GUID (i.e., the trace context ID) is flowed across to the Web application this is interfacing with the server that services that application's Web request. This Web request GUID allows the Web request to be watched as it makes its way through the system and back out.

While all events that happen during the course of servicing a Web request can be traced, not all events need to be traced. Rather, implementations of the Web request-based tracing tool can be directed to trace only specific Universal Resource Locator's (URL's), as well as to trace only certain areas of functionality. As such, an administrator can choose what URL's they want to trace so that not every URL is traced. Moreover, rather than tracing all Web requests, only those Web requests that are needed to be traced are traced.

Implementations of Web request-based tracing tool can limit tracing too only certain functionalities. For instance, tracing can be limited while a Web request is being serviced to the functionalities of authentication, security, compression, Common Gateway Interface (CGI), and/or filters. This limits tracing to only desired events, thus decreasing the amount of events raised and reducing the noise and the overall effect on system resources (disk, CPU, etc.).

In the case where Web request-based tracing is limited to a particular filter of interest, a trace can be put around a call into the filter. The trace log would then show what is going into the filter as well as what is coming out of the filter. A trace can be set up to only trace filter calls.

Yet another limitation can be placed upon the Web request event tracing tool with respect to the amount of information that is logged for each event that happens. This limitation is referred to herein as the level of 'verbosity' for the events that are desired to be logged. As discussed above with respect to FIG. 2, one or more data types 208 can be descriptive of a particular event 204(*k*) that occurred during the processing of the Web request to which the Web request GUID 206 has been assigned. The number of data types 208 for an event 204(k) can depend upon a specified level of verbosity that is to be logged for the particular event 204(k). The level of verbosity can be, for example, set to a certain threshold as follows:

0—No Data: The trace log will include only those events that give data that is required for a proper context as to what is occurring as a Web request is being serviced.

1—Fatal: The trace log will include '0', above, and an abnormal exit or termination; If an action will cause a process to exit, or if the problem can be caught before the process terminates, then the event is logged as a Fatal Error. As such, the Web request event tracing tool can persist in tracing events through an unexpected process termination.

2—Error: The trace log will include the above and severe errors that should be logged; If a process can not continue and the processing must immediately reject the Web request, and then the event is logged as an Error. (e.g., Anonymous user request/account password expired/password expires on account).

3—Warning: The trace log will include the above and the logging of the events that are warnings such as a resource allocation failure; if an unexpected result/error occurs but processing of the Web request can continue, the event will be logged as a Warning. (e.g., unhealthy server conditions; basic authentication failure; login failure).

4—Information: The trace log will include the above and non-error events such as Entry-Exit sequences or a process and other informative events.

5—Verbose: The trace log will include detailed traces from intermediate steps that occur during the servicing of a Web request.

The Web request event tracing tool can be activated at a server by an administrator. This activation instructs each worker process at the server to start tracing requests. If URL filtering is enabled, the server will check the URL and determine whether or not it is one of the previously specified URL's to trace. As the Web request is serviced by the server, the server determines whether or not it should publish a trace event for the request in key areas based on the functionality, verbosity, URL filtering rules, etc. Each event can publish the request ID (e.g., the Web request GUID) as the first part of user data in the trace event that is logged in a trace log file. In particular, the server's Web request-based trace events can be published with the Web request GUID as the first part of the user data published in each trace event in the log file. This way, an application can access the log file using the Web request GUID and can then correlate all the trace events that happened during the servicing of the Web request.

In one exemplary implementation where the Web request event tracing tool is a component of a server's operating system, Application Program Interfaces (APIs) are provided. These APIs allow Web applications that are running on or interfacing with the server to publish their own events as they happen, where these events are related to a Web request. These events are then logged with the associated Web request GUID that corresponds to each Web request that is being serviced by the server. In another exemplary implementation, the Web request event tracing tool can be turned on and off from remote locations, such as by various telecommunication tools. Additionally, trace events can be published to a remote location.

The Web request event tracing tool can be implemented in various way. One such implementation uses the tool to track a latency troubled Web request that is being serviced in order to find out where the latency is occurring. For instance, tracing can be used to track detailed events for long running Web requests, such as key transitions that occur when the server interfaces with Web based applications. In another implementation of the tool, the tool is able to get trace data even if a process crashes when a Web request is being serviced. Sometimes data for a Web request isn't put into an event log because code that is executing crashes and the writing to the event log does not take place for a Web request until after the Web response is determined and sent. Thus, if a particular Web request is crashing, the Web requests are not seen in the event log. Therefore, the tool is configured to ensure that trace data is persisted even through a process crash. Then, the Web request GUID corresponding to the Web request can be used to access the log file of events. The events corresponding to the Web request GUID can be viewed for each process that occurred as the Web request was being services. Moreover, the review of trace data can be remotely managed and reviewed.

An exemplary configuration of the Web request event tracing tool is to trace events so as to capture only information on requests that have "failed". This might be done because it may be difficult to reproduce circumstances under which a process fails.

As discussed above, the functionality of the Web request event tracing tool can be applied to any Web based application. For purposes of illustration, and not for limitation, one common category of a Web based application is an electronic commerce (e-commerce) application. An exemplary e-commerce application provided by the Microsoft Corporation of Redmond, Wash., includes Internet Server Application Program Interface (ISAPI) extensions and an Internet Information Services Server (IIS). An ISAPI extension implements API for the IIS and can be used to extend the server functionality. Examples of this functionality include ASP and ASP-.NET provided by the Microsoft Corporation. ASP implements an interface into which IIS can make calls. As such, examples of ISAPI extensions can include ASP and ASP-.NET. ISAPI is an interface layer between IIS and extensions that extend the functionality of the server.

The IIS can make use of an Event Tracing for Windows® (ETW) infrastructure, which is also provided by the Microsoft Corporation. ETW can do Web request tracing and is available to all tracing entities. In this exemplary e-commerce application, IIS and ISAPI calls into ETW to generate trace events which ETW then buffers and flushes to disk. The functionality of the Web request event tracing tool can be used in this exemplary Microsoft e-commerce application where the tool obtains and/or generates a Web request GUID for an e-commerce related Web request. For instance, all existing ETW events and new IIS trace events can use the Web request GUID as a first data item in an entry in a log file. In this environment, the server can have an executable that controls the tracing infrastructure that turns ETW on and off (i.e., logman.exe). The executable can call into the tracing infrastructure and set up a tracing session internally, and can provide a session handle to each process that is to run during the servicing of a Web request be the server.

The tool then associates the Web request GUID with events that happen during the servicing of the Web request. As events happen during the servicing of the Web request, an entry can be made for each event that is of interest in a log file, along with a specified level of verbosity. Each entry in the log file will be associated with the Web request GUID. A trace-enabled application that is running on the server that is servicing the Web request can then use the GUID to access the log file. This access allows a diagnosis to be made of the problems that happened when servicing the Web request. Thus, by using the Web request GUID associated with the Web request in assessing the trace in the log file, a correlation can be found between the ISAPI's trace events and the IIS trace events.

Implementations provide diagnosability of Web request-based tracing where a Web request GUID is flowed across to ISAPI extension layers of Web request processing. The ISAPI extension layers can include a component of the operating system and/or middleware. This Web request GUID allows the Web request to be watched as it makes its way through the system and back out. ASP.NET (e.g., ASPNET.dll) and ASP (e.g., ASP.dll) are both examples of ISAPI extensions that are loaded into a worker process. These ISAPI extensions call into IIS via ISAPI API's to get the Web request GUID for each request. These ISAPI extensions also use the ISAPI API's to communicate with IIS. ASP.net is an ISAPI extension that calls into IIS via ISAPI API's to get the Web request GUID. The ISAPI extension can call in to ask for more of the server variables for the Web request.

Implementations provide a server support function to communicate with an application infrastructure level (e.g., middleware layer, ISAPI extension, etc.) to pass up the Web request GUID should the application infrastructure level wish to trace itself. Because the tracing infrastructure is made public, any desirable degree tracing can be performed. If the application infrastructure level is to be correlated with the trace log, then the server support function can be provided to make information in the trace log available. The server support function provides a means by which an ISAPI extension can call into a Web server to find out what the Web request GUID is for a particular Web request so that the ISAPI extension can log trace messages that can then be correlated back to the trace messages of the Web server. The server support function can be integrated with both ASP and ASP.NET. An example of a trace file for this environment is seen in the Appendix.

A report can be made on the trace file using the GUID for a Web request. An application that generates the report puts the tracings in the trace file back together to reconstruct what events happened during a process. The GUID is used by the report generation application to locate relevant trace messages that can be strung together so as to represent data necessary to show a back tracking of everything (or only certain events of interest) that happened for a specific request. There can be, however, more that one Web request that is contained in the report. For instance, Web requests can be generated by use of a Web page. The Web page can have multiple Web requests (e.g., multiple functionalities). In a Web page associated with an e-commerce application, several different Web requests could be generated: a request to go to an initial Web page of multiple Web pages where an order can be placed; a request to place an order; a request to query the order; a request to change the order; a request to cancel the order; etc. The use of a Web request GUID enables all trace events/messages to be grouped together for a specific Web request.

Figure 3:
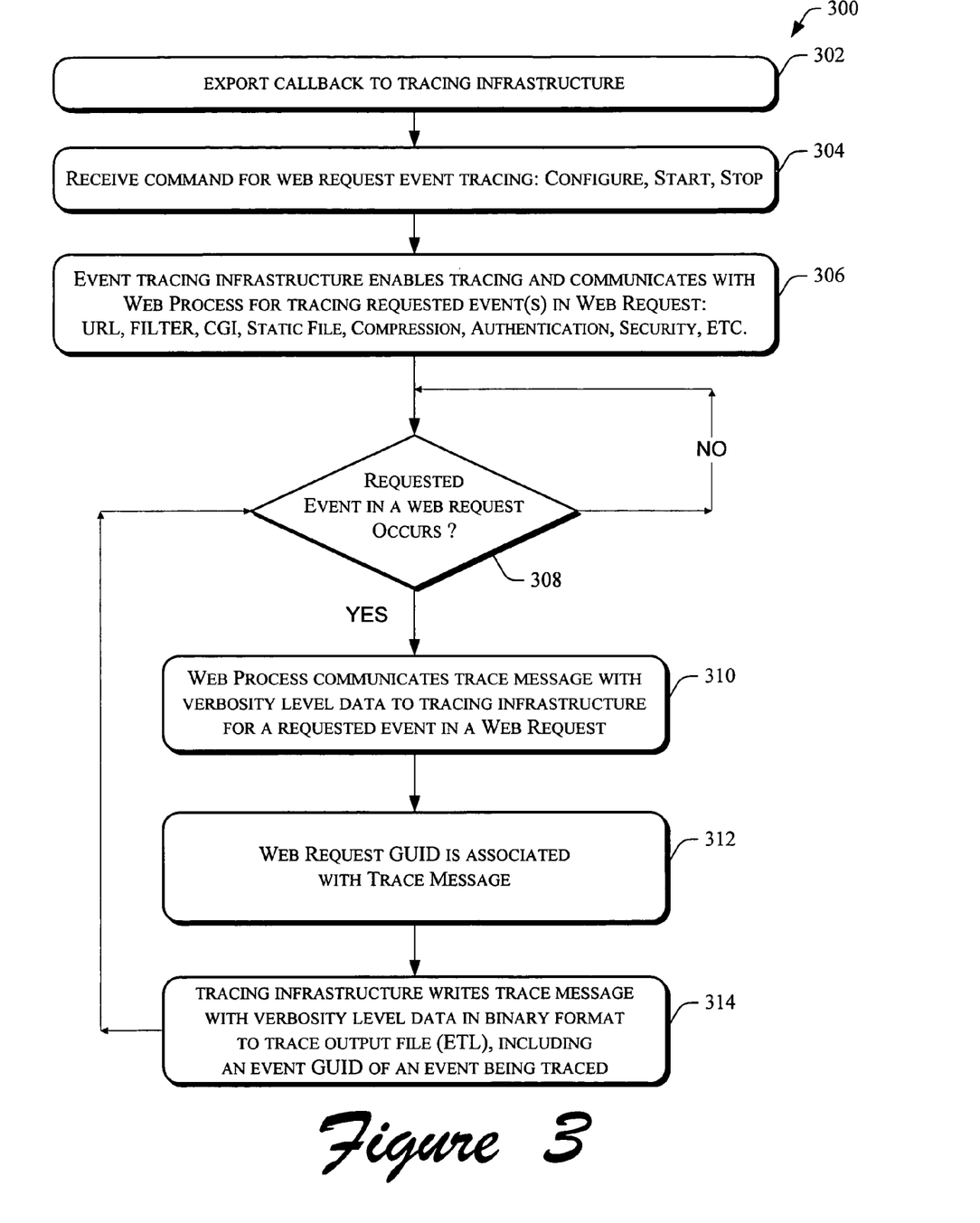
FIG. 3 is a flowchart of an exemplary process for logging events that happen into an event trace output file during the servicing of a Web request.

FIG. 3 depicts a flowchart for an exemplary process 300. Process 300, which illustrates an exemplary operation of the Web request event tracing tool implementations described herein, can be performed in the exemplary network environment 100 seen in FIG. 1. A server, such as server 134 seen in FIG. 1, can service a Web request while using process 300 so as to log events that happen into one or more event trace output files, such as are seen in FIG. 2, during the servicing of the Web request.

Process 300 has a block 302 at which an export of a callback is made to a tracing infrastructure of the server. As mentioned above, exemplary tracing infrastructures are seen in FIG. 1 as being Web request tracing application 140 and trace infrastructure 144 that is part of the operating system 142 of server 134. By way of example of block 302 in a WINDOWS® operating system provided by the Microsoft Corporation, when a Web process starts up via a start up routine, the Web process calls ETW to register which providers are to be listened for to determined whether they will request tracing. As such, block 302 registers a 'callback' connection to communicate that it has tracing available and is seek interested providers that will request use of the Web request event tracing tool. At block 304, a command can be received to configure, start, or stop Web request tracing. Block 304 communicates with Web processes via a call back function that a request has been made by an entity for event tracing.

At a block 306, configuration of the kind of event tracing that is to be done is specified. The configuration allows the event tracing infrastructure to enable tracing and to communicate with a Web process for the particular kinds of events that are to be traced for a Web request. For instance, the requested events that are to be traced incident to a Web request can include the tracing of events related to one or more URLs, one or more filters, one or more CGIs, interactions with one or more static files, any kind of compression, events having to do with authentications or security, etc. At block 306, the level of verbosity to be reported for an event of interest can also be configured.

After the configuration at block 306, process 300 moves to a query 308. Query 308 is looped until it determines that an event of interest has occurred pertaining to a Web request, such as an event that happens at a server that is servicing the Web request. When so determined, process 300 moves to a block 310 at which a Web process within which the event of interest has occurred, incident to the serving of a Web request, communicates a trace message along with the configured verbosity level data to the tracing infrastructure. A component of the tracing infrastructure that receives the tracing messages can be, for instance, a kernel trace session component of the operating system of the server. Here, the kernel trace session can perform event buffering as trace messages that are received are processed.

At a block 312, in the depicted implementation, the tracing infrastructure associates a Web Request GUID with the trace message. The event is then logged by the tracing infrastructure at block 314 into a trace output file (e.g., event trace log) along with the Web Request GUID of the corresponding Web request, including an event GUID for each event that is being traced. Note the Web Request GUID corresponds to the request and the event GUID corresponds to a particular event. The entry for the event includes a trace message that reflects the configured verbosity level for the event. The data in the entry can be in a binary format. Process 300 then loops back to block 308 to monitor the processing of the Web request for the occurrence of any more events of interest that might occur. After the Web request has been serviced by the server, process 300 can terminate (not shown).

Figure 4:
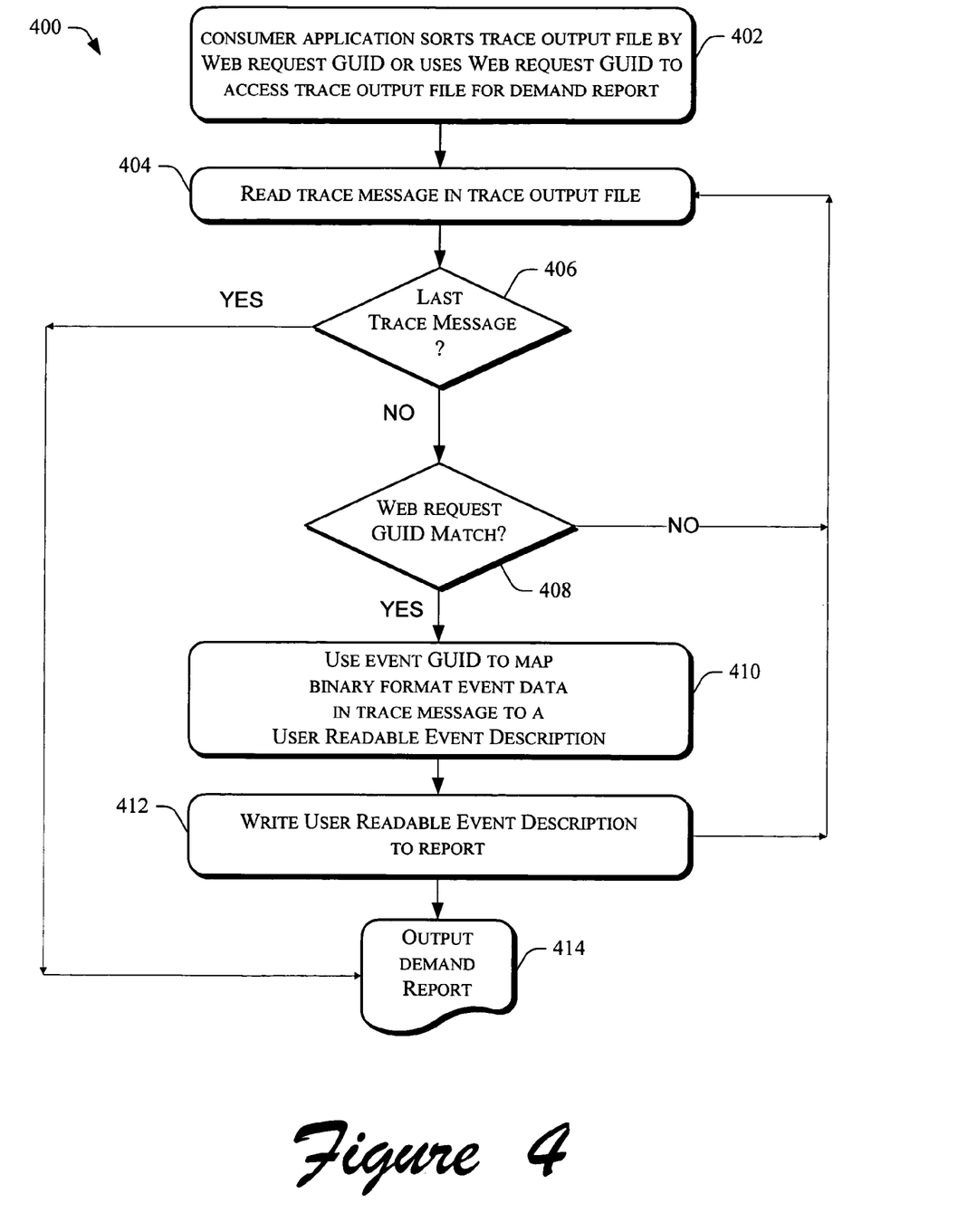
FIG. 4 is a flowchart of an exemplary process for producing a demand report of events that happen during the servicing of a Web request, where a trace log file is opened to obtain an identifier for each trace event, where each identifier for each trace event is used to decode the data in each trace event, and where Web request identifiers are also used to uniquely identify each Web request and all of the trace events that correspond to the Web request.

An exemplary process 400 for reporting on the events that occur when a Web request is serviced is depicted by way of a flowchart in FIG. 4. At a block 402, a report generation application (e.g., a consumer application) makes a demand to access an event trace output file. To obtain the events in the event trace output file of interest, the application uses a Web request GUID that corresponds to the Web request of interest. Alternatively, the consumer application can sort the event trace output file by Web request GUID first and then by timestamp. As such, a report can be generated from the sorted output to show those events that are grouped by Web request GUID. As a further alternative, the start and end events can be reported from the sorted output for a given event GUID, such as the start of a particular filter event and the end of the particular filter event. Of course, other reports can be generated from the traced events in the event trace log file.

A block 404 reads a trace message from the event trace output file and a query 406 determines whether there are no more trace messages in the event trace output file. If so, the process 400 moves to a block 414. Otherwise, a query 408 determines if the Web request GUID of interest matches the Web request GUID in the trace message. If not, the process 400 returns to block 404. Otherwise, at a block 410, the report generation application uses each event GUID in the event trace output file that corresponds to the Web request GUID to generate a report the corresponds to the Web request GUID. Each event GUID can be used to map the binary format event data in the trace message into an event description that is in a format that is human readable. Here, a Managed Object Format (MOF) can be used. A MOF is a way to describe the event structure of data related to an event that has been logged as a trace message. The MOF maps the event GUID into a format that is human readable in order to translate from the original binary format. The event GUID for the trace event can be, for instance, the first 128 bits of the data corresponding to every event. In one implementation, Data Type (1) 208 can be an event GUID for an event 204 (k), as seen in FIG. 2. Thus, the event GUID is used to 'decode' the binary data in a trace message.

At a block 412, the mapped readable event description is written to a storage location and process 400 returns to block 404. When process 400 moves to block 414, the storage location is accessed to retrieve one or more mapped readable event descriptions. Each retrieved event description can be output in a report.

Diagnostic personnel can review the report to determine what events happened when a Web request corresponding to the Web request GUID specified was being serviced by a server. The report can be useful in diagnosing problematic issues that arise on servers and clients, such as the performance of a Web request and/or issues relating to a failed Web request. Latency problems on a Web request, problems with particular installed filters, and a Web request that stops being serviced can also be analyzed through use of the report. The diagnostic personnel can perform analysis of Web requests using the report which can be desirably designed to contain only relevant information. As such, the report will be significantly less verbose than conventional process dump files generated during execution of code for servicing the Web request.

A Computer System

Figure 5:
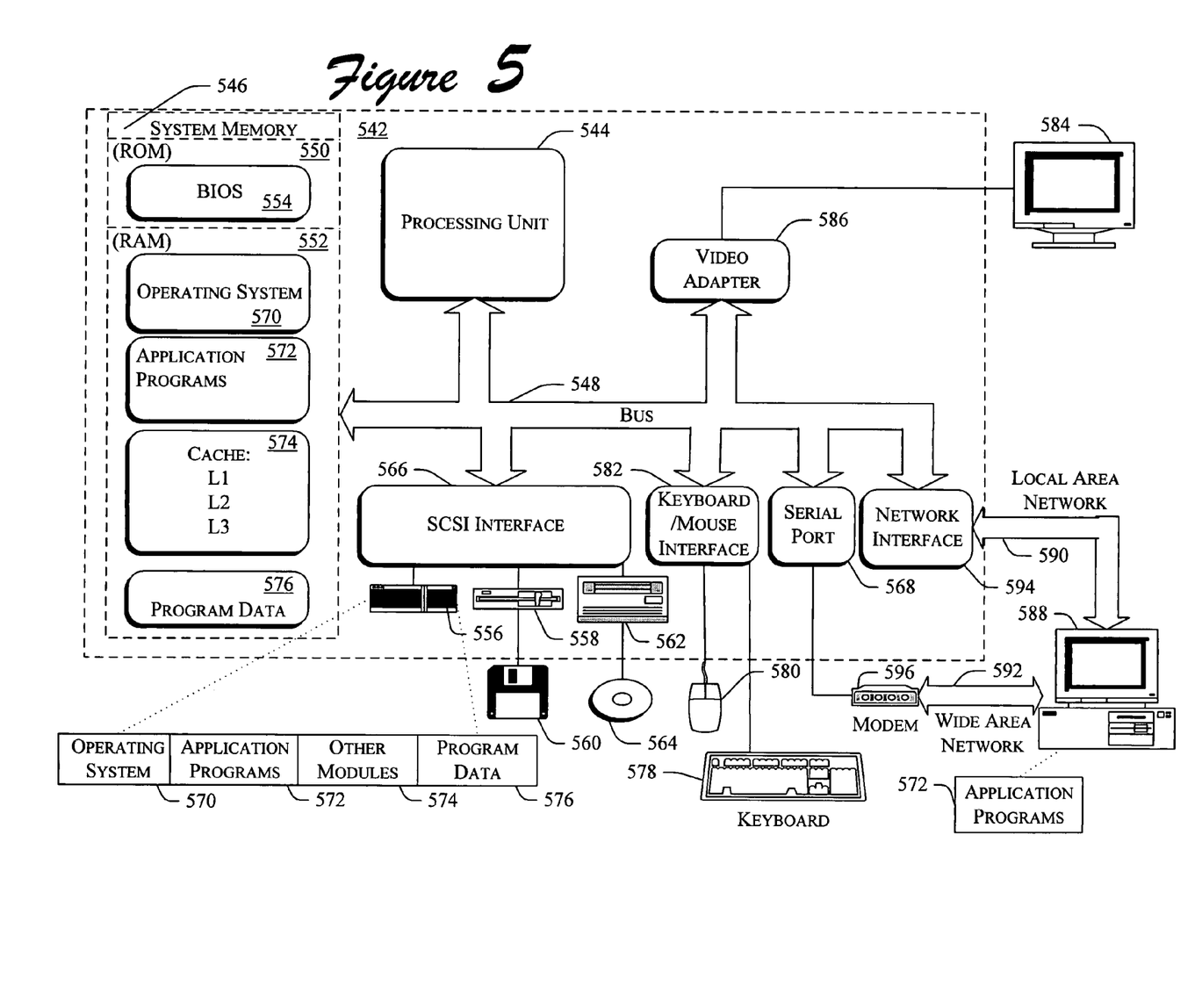
FIG. 5 is a block diagram of an exemplary environment capable of supporting any server or client depicted in FIG. 1.

FIG. 5 shows an exemplary computer system, such as a server, that can be used to implement the processes described herein. Computer 542 includes one or more processors or processing units 544, a system memory 546, and a bus 548 that couples various system components including the system memory 546 to processors 544. The bus 548 represents one or more of any of several types of bus structures, including a memory bus or memory controller, a peripheral bus, an accelerated graphics port, and a processor or local bus using any of a variety of bus architectures. The system memory 546 includes read only memory (ROM) 550 and random access memory (RAM) 552. A basic input/output system (BIOS) 554, containing the basic routines that help to transfer information between elements within computer 542, such as during start-up, is stored in ROM 550.

Computer 542 further includes a hard disk drive 556 for reading from and writing to a hard disk (not shown), a magnetic disk drive 558 for reading from and writing to a removable magnetic disk 560, and an optical disk drive 562 for reading from or writing to a removable optical disk 564 such as a CD ROM or other optical media. The hard disk drive 556, magnetic disk drive 558, and optical disk drive 562 are connected to the bus 548 by an SCSI interface 566 or some other appropriate interface. The drives and their associated computer-readable media provide nonvolatile storage of computer-readable instructions, data structures, program modules and other data for computer 542. Although the exemplary environment described herein employs a hard disk, a removable magnetic disk 560 and a removable optical disk 564, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 556, magnetic disk 560, optical disk 564, ROM 550, or RAM 552, including an operating system 570, one or more application programs 572 (such as the Web request trace application 140), cache/other modules 574, and program data 576. The operating system 570 can include a Web request event tracing tool as described herein (such as the trace infrastructure 144). A user may enter commands and information into computer 542 through input devices such as a keyboard 578 and a pointing device 580. Other input devices (not shown) may include a microphone, joystick, game pad, satellite dish, scanner, or the like. These and other input devices are connected to the processing unit 544 through an interface 582 that is coupled to the bus 548. A monitor 584 or other type of display device is also connected to the bus 548 via an interface, such as a video adapter 586. In addition to the monitor, personal computers typically include other peripheral output devices (not shown) such as speakers and printers.

Computer 542 commonly operates in a networked environment using logical connections to one or more remote computers, such as a remote computer 588. The remote computer 588 may be a personal computer, another server, a router, a network PC, a peer device or other common network node, and typically includes many or all of the elements described above relative to computer 542. The logical connections depicted in FIG. 5 include a local area network (LAN) 590 and a wide area network (WAN) 592. Such networking environments are commonplace in offices, enterprise-wide computer networks, intranets, and the Internet.

When used in a LAN networking environment, computer 542 is connected to the local network through a network interface or adapter 594. When used in a WAN networking environment, computer 542 typically includes a modem 596 or other means for establishing communications over the wide area network 592, such as the Internet. The modem 596, which may be internal or external, is connected to the bus 548 via a serial port interface 568. In a networked environment, program modules depicted relative to the personal computer 542, or portions thereof, may be stored in the remote memory storage device. It will be appreciated that the network connections shown are exemplary and other means of establishing a communications link between the computers may be used.

Generally, the data processors of computer 542 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Any of the functions described herein can be implemented using software, firmware (e.g., fixed logic circuitry), manual processing, or a combination of these implementations. The term "logic" or "module" as used herein generally represents software, firmware, or a combination of software and firmware. For instance, in the case of a software implementation, the term "logic" or "module" represents program code that performs specified tasks when executed on a processing device or devices (e.g., CPU or CPUs). The program code can be stored in one or more computer readable memory devices. The illustrated separation of logic and modules into distinct units may reflect an actual physical grouping and allocation of such software and/or hardware, or can correspond to a conceptual allocation of different tasks performed by a single software program and/or hardware unit. The illustrated logic and modules can be located at a single site (e.g., as implemented by a single processing device), or can be distributed over plural locations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

---

Appendix: Exemplary Trace File

---

Microsoft (R) Windows Script Host Version 5.6
Copyright (C) Microsoft Corporation 1996-2001. All rights reserved.
-------------------------------------------------------------------------------------------------------------------------------------
---
Request n.1: /datetime.asp {00000000-0000-0000-0200-0060000000fe} 2003-11-10 2:47:16
    IISGeneral: GENERAL_REQUEST_START - IIS starts processing a new request
        SiteId: 1
        AppPoolId: DefaultAppPool
        ConnId: 1073741825
        RawConnId: 0
        RequestURL: /datetime.asp
        RequestVerb: GET
        Timestamp: 02:47:16.936.270800
    IISFilter: FILTER_START - W3 filter starts
        FilterName: C:\WINNT\Microsoft.NET\Framework\v1.1.4322\aspnet_filter.dll
        Timestamp: 02:47:16.936.270800
    IISFilter: FILTER_PREPROC_HEADERS_START - Filter starts PREPROC_HEADERS notification
        Timestamp: 02:47:16.936.270800
    IISFilter: FILTER_PREPROC_HEADERS_END - Filter ends PREPROC_HEADERS notification
        Timestamp: 02:47:16.936.270800
    IISFilter: FILTER_END - W3 filter ends
        Timestamp: 02:47:16.936.270800
    IISCache: URL_CACHE_ACCESS_START - IIS starts accessing URL cache to get metadata
        RequestURL: /datetime.asp
        Timestamp: 02:47:16.936.270800
    IISGeneral: GENERAL_GET_URL_METADATA - IIS gets URL metadata
        Physical Path: c:\inetpub\wwwroot\datetime.asp
        AccessPerms: Read+Script
        Timestamp: 02:47:17.066.464500
    IISCache: URL_CACHE_ACCESS_END - IIS ends accessing URL cache
        Physical Path: c:\inetpub\wwwroot\datetime.asp
        ErrorCode: 0x00000000
        URLInfoFromCache: 0
        URLInfoAddedToCache: 0
        Timestamp: 02:47:17.066.464500
    IISFilter: FILTER_START - W3 filter starts
        FilterName: C:\WINNT\Microsoft.NET\Framework\v1.1.4322\aspnet_filter.dll
        Timestamp: 02:47:17.066.464500
    IISFilter: FILTER_URL_MAP_START - IIS starts URL_MAP notification
        AccessPerms: 0x00000201
        MatchingPath: 18
        MatchingURL: 0

-continued

Appendix: Exemplary Trace File

ScriptMapEntry: C:\WINNT\system32\inetsrv\asp.dll
        OrigURL: /datetime.asp
        OrigPath: c:\inetpub\wwwroot\datetime.asp
        Timestamp: 02:47:17.066.464500
    IISFilter: FILTER__URL__MAR__END - IIS ends URL__MAP notification
        AccessPerms: 0x00000201
        FinalURL: /datetime.asp
        Final Path: c:\inetpub\wwwroot\datetime.asp
        MatchingPath: 18
        MatchingURL: 0
        ScriptMapEntry: C:\WINNT\system32\inetsrv\asp.dll
        Timestamp: 02:47:17.066.464500
    IISFilter: FILTER__END - W3 filter ends
        Timestamp: 02:47:17.066.464500
    IISAuthentication: AUTH__START - IIS authentication starts
        AuthTypeSupported: Anonymous+NT
        Timestamp: 02:47:17.066.464500
    IISAuthentication: AUTH__REQUEST__AUTH__TYPE - Authentication type in the request
        RequestAuthType: Anonymous
        Timestamp: 02:47:17.066.464500
    IISAuthentication: AUTH__SUCCEEDED - IIS authentication succeeds
        NTLMUsed: 0
        AuthType: Anonymous
        RemoteUserName:
        AuthUserName:
        TokenImpersonationLevel: 0x00000002
        Timestamp: 02:47:17.066.464500
    IISAuthentication: AUTH__END - IIS authentication ends
        Timestamp: 02:47:17.066.464500
    IISCache: FILE__CACHE__ACCESS__START - IIS starts accessing file cache
        FileName: c:\inetpub\wwwroot\datetime.asp
        UserName: IUSR__ERICDE-VS-SP1
        DomainName: ERICDE-VS-SP1
        Timestamp: 02:47:17.086.494300
    IISCache: FILE__CACHE__ACCESS__END - IIS ends accessing file cache
        ErrorCode: 0x00000000
        Successful: 1
        FileFromCache: 0
        FileAddedToCache: 0
        FileDirmoned: 1
        LastModCheckErrorIgnored: 0
        Timestamp: 02:47:17.156.598600
    IISISAPI: ISAPI__START - IIS starts processing an ISAPI Request
        Timestamp: 02:47:17.156.598600
    IISGeneral: GENERAL__ISAPI__HANDLER - IIS processes an in-proc ISAPI request
        Timestamp: 02:47:17.156.598600
    W3Isapi: CALL__ISAPI__EXTENSION - Call Isapi Extension
        DllName: C:\WINNT\system32\inetsrv\asp.dll
        Timestamp: 02:47:17.937.760800
    AspReq: ASP__START__REQUEST - Start Request
        Physical Path: c:\inetpub\wwwroot\datetime.asp
        Timestamp: 02:47:17.937.760800
    AspReq: ASP__FIRST__REQUEST__FOR__ASP - First request
        Timestamp: 02:47:17.937.760800
    IISCache: URL__CACHE__ACCESS__START - IIS starts accessing URL cache to get metadata
        RequestURL: /
        Timestamp: 02:47:18.648.818700
    IISGeneral: GENERAL__GET__URL__METADATA - IIS gets URL metadata
        Physical Path: c:\inetpub\wwwroot\
        AccessPerms: Read+Script
        Timestamp: 02:47:18.678.863400
    IISCache: URL__CACHE__ACCESS__END - IIS ends accessing URL cache
        PhysicalPath: c:\inetpub\wwwroot\
        ErrorCode: 0x00000000
        URLInfoFromCache: 0
        URLInfoAddedToCache: 0
        Timestamp: 02:47:18.678.863400
        AspReq: ASP__FIRST__REQUEST__FOR__APPLICATION - First request for application
        ApplicationPath: C:\INETPUB\WWWROOT\
        Timestamp: 02:47:18.678.863400
    IISCache: URL__CACHE__ACCESS__START - IIS starts accessing URL cache to get

| Appendix: Exemplary Trace File |
| --- | metadata
    RequestURL: /
    Timestamp: 02:47:18.718.923000
  IISGeneral: GENERAL_GET_URL_METADATA - IIS gets URL metadata
    Physical Path: c:\inetpub\wwwroot\
    Access Perms: Read+Script
    Timestamp: 02:47:18.718.923000
  IISCache: URL_CACHE_ACCESS_END - IIS ends accessing URL cache
    Physical Path: c:\inetpub\wwwroot\
    ErrorCode: 0x00000000
    URLInfoFromCache: 0
    URLInfoAddedToCache: 1
    Timestamp: 02:47:18.718.923000
  AspReq: ASP_START_GLOBAL_ASA_CHECK - Start Global.ASA check
    GlobalASAPath: C:\INETPUB\WWWROQT\GLOBAL.ASA
    Timestamp: 02:47:18.789.027300
  AspReq: ASP_GLOBAL_ASA_DOES_NOT_EXIST - Global.ASA does not exist
    Timestamp: 02:47:18.789.027300
  AspReq: ASP_END_GLOBAL_ASA_CHECK - End Global.ASA check
    Timestamp: 02:47:18.789.027300
  AspReq: ASP_NEW_SESSION_CREATED - New Session Created
    SessionId: FLILJEEDHAGHEDOLFANHMGDF
    Timestamp: 02:47:18.789.027300
  AspReq: ASP_QUEUE_REQUEST - Queue Request
    Timestamp: 02:47:18.819.072000
  AspReq: ASP_DEQUEUE_REQUEST - Dequeue Request
    Timestamp: 02:47:18.939.250800
  AspReq: ASP_START_CACHE_ACCESS - Check Cache Begin
    FilePath: C:\INETPUB\WWWROOT\DATETIME.ASP
    Timestamp: 02:47:18.939.250800
  AspReq: ASP_START_COMPILE - Begin Compilation
    FilePath: C:\INETPUB\WWWROOT\DATETIME.ASP
    Timestamp: 02:47:18.939.250800
  AspReq: ASP_READ_FILE - Read File
    FilePath: C:\INETPUB\WWWROOT\DATETIME.ASP
    Timestamp: 02:47:18.939.250800
  AspReq: ASP_END_COMPILE - End Compilation
    Timestamp: 02:47:19.560.174600
  AspReq: ASP_END_CACHE_ACCESS - Check Cache End
    ErrorCode: 0x00000000
    AccessResult: SERVED_CACHE_MISS
    Timestamp: 02:47:19.560.174600
  AspReq: ASP_START_SCRIPT_EXECUTION - Start Script Execution
    Timestamp: 02:47:19.570.189500
  AspReq: ASP_SCRIPT_TRACE_START - ASP Script Trace Info
    FilePath: C:\INETPUB\WWWROOT\DATETIME.ASP
    Timestamp: 02:47:19.570.189500
  AspReq: ASP_SCRIPT_TRACE_COM_CALL_START - ASP Script Trace Object Invocation Info
    FilePath: C:\INETPUB\WWWROOT\DATETIME .ASP
    LineNumber: 3
    CurrentStatement: Set objBrowser = Server.CreateObject("MSWC.BrowserType")
    SizeOfStatement: 56
    Timestamp: 02:47:19.570.189500
  AspReq: ASP_SCRIPT_TRACE_COM_CALL_END - ASP Script Trace Object Invocation Info
    FilePath: C:\INETPUB\WWWROOT\DATETIME.ASP
    LineNumber: 3
    CurrentStatement: Set objBrowser = Server.CreateObject("MSWC.BrowserType")
    SizeOfStatement: 56
    Timestamp: 02:47:19.930.725900
  AspReq: ASP_SCRIPT_TRACE_COM_CALL_START - ASP Script Trace Object Invocation Info
    FilePath: C:\INETPUB\WWWROOT\DATETIME.ASP
    LineNumber: 5
    CurrentStatement: Response.Write(objBrowser.Browser)
    SizeOfStatement: 34
    Timestamp: 02:47:19.930.725900
  AspReq: ASP_SCRIPT_TRACE_COM_CALL_END - ASP Script Trace Object Invocation Info
    FilePath: C:\INETPUB\WWWROOT\DATETIME.ASP
    LineNumber: 5
    CurrentStatement: Response.Write(objBrowser.Browser)

-continued

Appendix: Exemplary Trace File

```
        SizeOfStatement: 34
        Timestamp: 02:47:19.930.725900
    AspReq: ASP_SCRIPT_TRACE_COM_CALL_START - ASP Script Trace Object
Invocation Info
        FilePath: C:\INETPUB\WWWROOT\DATETIME.ASP
        LineNumber: 6
        CurrentStatement: Response.Write(objBrowser.Version)
        SizeOfStatement: 34
        Timestamp: 02:47:19.930.725900
    AspReq: ASP_SCRIPT_TRACE_COM_CALL_END - ASP Script Trace Object
Invocation Info
        Filepath: C:\INETPUB\WWWROOT\DATETIME.ASP
        LineNumber: 6
        CurrentStatement: Response.Write(objBrowser.Version)
        SizeOfStatement: 34
        Timestamp: 02:47:19.930.725900
    AspReq: ASP_SCRIPT_TRACE_END - ASP Script Trace Info
        FilePath: C:\INETPUB\WWWROOT\DATETIME.ASP
        Timestamp: 02:47:19.940.740800
    AspReq: ASP_END_SCRIPT_EXECUTION - End Script Execution
        Timestamp: 02:47:19.940.740800
        IISCache: HTTPSYS_CACHEABLE - IIS decides if the request is HTTP.SYS
cacheable
        HttpsysCacheable: 1
        Reason: OK
        Timestamp: 02:47:19.940.740800
    AspReq: ASP_DONE_PROCESSING - ASP Done Processing
        Timestamp: 02:47:19.970.785500
    W3Isapi: NOTIFY_ISAPI_COMPLETION - Notify Isapi of Completion
        Timestamp: 02:47:19.970.785500
    AspReq: ASP_END_REQUEST - End Request
        Timestamp: 02:47:19.970.785500
    W3Isapi: ISAPI_EXTENSION_DONE - Isapi Extension Done
        Timestamp: 02:47:19.970.785500
    IISISAPI: ISAPI_END - IIS ends processing an ISAPI Request
        Timestamp: 02:47:19.970.785500
    IISGeneral: GENERAL_REQUEST_END - IIS ends processing a request
        HttpStatus: 200
        HttpSubStatus: 0
        BytesSent: 354
        BytesReceived: 263
        Timestamp: 02:47:20.000.830200
Total time: 4000 msecs
```

What is claimed is:

1. A method comprising:

servicing a Web request from a Web application;

associating a Web request Globally Unique Identifier (Web request GUID) with the Web request, wherein events which happen during servicing of the Web request can be identified by the Web request GUID, wherein the servicing comprises executing the Web application and wherein the Web application interfaces with a server that services the Web request;

detecting the occurrence of an event in the servicing of the Web request during the execution of the Web application, wherein a kernel trace session component of an operating system of the server performs event buffering to detect the occurrence of the event and traces are processed by a kernel of the operating system when the operating system processes a part of the Web request;

logging by the server a server entry in a server trace log in response to the detecting of the occurrence of the event in the servicing of the Web request, wherein the server entry comprises:

information descriptive of the occurrence of the event in the servicing of the Web request;

a server event GUID corresponding to the event; and the Web request GUID corresponding to the Web request;

logging by the Web application an application entry having an application GUID in an application trace log, wherein each application entry is correlated with each server entry in the server trace log by a Web request GUID, and wherein at least one of the detecting and the logging are performed by one or more components of the operating system of the server; and determining which of the information that is descriptive of the occurrence of the event to put into the server entry or application entry, or both the server entry and the application entry, as appropriate, as a function of a predetermined level of verbosity selected from a plurality of levels of verbosity for the Web application and server.

2. The method as defined in claim 1, wherein the server entry is logged in the server trace log during the servicing of the Web request only when the event is selected from the group consisting of:

the event pertains of the functionality of authentication;

the event pertains of the functionality of security;

the event pertains of the functionality of compression;

the event pertains of the functionality of a Common Gateway Interface (CGI); and the event pertains of the functionality of one or more filters.

3. The method as defined in claim 1, wherein:
the server entry is logged in the server trace log during the servicing of the Web request only when the event pertains to a predetermined filter; and
the information comprises data going into the predetermined filter and data coming out of the predetermined filter.

4. The method as defined in claim 1, wherein:
the server services the Web request from the Web application;
the operating system of the server comprises one or more Application Program Interfaces (APIs);
the Web application is executed by, or interfaces with, the server;
the Web application interfaces with at least one said API to log a Web application event as a Web application entry in the server trace log;
the Web application event occurs within the Web application itself; and
the Web application entry comprises:
information descriptive of the occurrence of the Web application event in the servicing of the Web request by the server when the Web application is running on, or interfacing with, the server; and
the GUID corresponding to the Web request.

5. The method as defined in claim 1, wherein at least one of the detecting and the logging are performed by one or more server applications that are executed by the server.

6. The method as defined in claim 5, wherein:
the operating system of the server includes one or more APIs;
the Web application is executed by, or interfaces with, the server;
the Web application interfaces with at least one said API to log a Web application event as a Web application entry in the server trace log;
the Web application event occurs within the Web application itself; and
the Web application entry comprises:
information descriptive of the occurrence of the Web application event in the servicing of the Web request by the server when the Web application is running on, or interfacing with, the server; and
the GUID corresponding to the Web request.

7. The method as defined in claim 1, wherein filtering is performed on a URL basis, wherein each predetermined level of verbosity corresponds to a different number of data types available for use in logging application entries and server entries, and wherein each data type corresponds to a different kind of data that is descriptive of the particular event.

8. The method as defined in claim 1, further comprising generating a report comprising at least a portion of the information in each said server entry or application entry, as appropriate, for which the Web request or server event GUID in the server entry or application entry, as appropriate, matches a supplied ID, wherein the amount of information in the report is a function of a predetermined level of verbosity selected from a plurality of levels of verbosity.

9. The method as defined in claim 8, wherein:
each said server entry and each said application entry is in a binary format; and
the generating of the report further comprises using an event GUID corresponding to each said event to map the binary format of each said server entry or application entry, as appropriate, into an event description that is in a format that is human readable.

10. The method as defined in claim 1, wherein the Web request GUID or the event GUID is the first portion of the server entry or application entry.

11. The method as defined in claim 1, wherein the Web request GUID is unique to the Web request with respect to other said Web requests.

12. A computer-readable medium having stored thereon computer-executable instructions, that when executed by a processor of a computing device, cause the computing device to perform acts comprising:
associating a Web request Globally Unique Identifier (Web request GUID) with a Web request, wherein events which happen during servicing of the Web request can be identified by the Web request GUID, wherein the servicing comprises executing a Web application that interfaces with a server having an operating system and that is servicing the Web request;
servicing the Web request with a server from a Web application that is executing on the server, wherein during the servicing multiple logger streams are simultaneously active to log the events as the Web request is being serviced by the server;
detecting the occurrence of the events during the servicing of the Web request by the server, wherein a kernel trace session component of an operating system of the server performs event buffering to detect the occurrence of each event and traces are processed by a kernel of the operating system when the operating system processes a part of each Web request;
logging by the server each of the events as server entries in a server trace log, wherein at least one of the detecting and the logging are performed by one or more components of the operating system of the server, and wherein each server entry comprises:
information descriptive of the occurrence of an event;
an event GUID corresponding to the event; and
the Web request GUID corresponding to the Web request;
logging by the Web application an application entry having an application GUID in an application trace log, wherein each application entry is correlated with each server entry in the server trace log by a Web request GUID; and
determining which of the descriptive information to put into the server entry or application entry, or both the server entry and the application entry, as appropriate, as a function of a predetermined level of verbosity selected from a plurality of levels of verbosity for the Web application and server.

13. The computer-readable medium as defined in claim 12, wherein the entry is logged in the server trace log during the servicing of the Web request by the server only when the event is selected from the group consisting of:
the event occurs within the context of a predetermined URL;
the event pertains of the functionality of authentication;
the event pertains of the functionality of security;
the event pertains of the functionality of compression;
the event pertains of the functionality of a CGI; and
the event pertains of the functionality of one or more filters.

14. The computer-readable medium as defined in claim 12, wherein the entry is logged in the server trace log during the servicing of the Web request by the server only when the event pertains to a predetermined filter, wherein the information comprises data going into the predetermined filter and data coming out of the predetermined filter.

15. The computer-readable medium as defined in claim 12, wherein the method further comprises at least one of:
   activating the logging when the logging is deactivated; and
   deactivating the logging when the logging is activated.

16. The computer-readable medium as defined in claim 15, wherein the activating and the deactivating are performed remotely from the server.

17. The computer-readable medium as defined in claim 15, wherein the server trace log is in a remote location from the server.

18. The computer-readable medium as defined in claim 12, wherein at least one of the detecting and the logging are performed by one or more components of an operating system of the server.

19. The computer-readable medium as defined in claim 18, wherein:
   the operating system of the server comprises one or more APIs; and
   the Web application interfaces with at least one said API for the logging of each said Web application event as an entry in the server trace log.

20. The computer-readable medium as defined in claim 12, wherein:
   the operating system of the server comprises one or more APIs; and
   the Web application interfaces with at least one said API for the logging of each said Web application event as an entry in the application trace log.

21. The computer-readable medium as defined in claim 12, wherein the step of logging of the entry in the server trace log is in response to the detecting of the occurrence of the event in the servicing of the Web request.

22. The computer-readable medium as defined in claim 12, where the method further comprises generating a report containing at least a portion of the information in each said entry for which the Web request GUID in the entry matches a supplied ID.

23. The computer-readable medium as defined in claim 22, wherein:
   each said entry is in a binary format; and
   the generating of the report further comprises using the event GUID to map the binary format of each said entry into an event description that is in a format that is human readable.

24. The computer-readable medium as defined in claim 12, wherein the Web request GUID is the first portion of the entry.

25. The computer-readable medium as defined in claim 12, wherein the Web request GUID is unique to the Web request with respect to other said Web requests, and wherein the Web request is for at least one of: a static file; a
   Common Gateway Interface (CGI); and an active server page (ASP).

26. A system having a processor for tracing a Web request on a network, the system comprising:
   identifying means for identifying when a predetermined event occurs in a predetermined Web request when the predetermined Web request is being serviced, wherein a kernel trace session component of an operating system of the system performs event buffering to detect the occurrence of the event and traces are processed by a kernel of the operating system when the operating system services a part of the Web request;
   a logging means, in communication with the identifying means, for logging the event in a server trace log as the event happens, wherein the log of the event in the server trace log comprises:
      a GUID corresponding to the predetermined Web request; and
      information descriptive of the occurrence of the event when the predetermined Web request is being serviced, wherein the logging means is further for determining which of the information that is descriptive of the occurrence of the event to put into the server entry in the server trace log as a function of a predetermined level of verbosity, wherein the level of verbosity is selected from a plurality of verbosity levels;
   a second logging means, in communication with the identifying means, for logging the event in an application trace log after the event happens, wherein the logging of the event in the application trace log comprises:
      a GUID corresponding to the predetermined Web request; and
      information descriptive of the occurrence of the event when the predetermined Web request is being serviced, wherein the second logging means is further for determining which of the information to put into the application entry as a function of a predetermined level of verbosity, wherein the level is selected from a plurality of verbosity levels; and
   a correlation means for correlating each application entry with each server entry in the server trace log by a Web request GUID.

27. A network environment comprising a server having a processor, an operating system and multiple simultaneously active logger streams that are concurrently running on the server and that are each trace-enabled, the server servicing Web requests from a Web application while performing Web request-based tracing to produce traces in a server trace log that comprise a Web request GUID for each Web request and to flow each Web request GUID from the server across to the Web application, wherein the Web application produces traces in a Web application trace log, wherein the traces in the server trace log and the Web application trace log comprise information that is descriptive of events which occur during the servicing of the Web request by the server and the Web application, wherein the information in the traces is determined in part as a function of a predetermined level of verbosity, wherein the level is selected from a plurality of levels of verbosity for the server and the Web application, wherein the Web application correlates each event in the Web application trace log with a server GUID from the server by a Web request GUID, and wherein a kernel trace session component of the operating system of the server performs event buffering to detect the occurrence of the events and traces are processed by a kernel of the operating system when the operating system processes a part of each Web request.

28. The network environment as defined in claim 27, wherein the server returns each said trace from the multiple logger streams to a corresponding said trace-enabled Web application for which the Web request was serviced by the server.

29. A server module operating on a server, the server module comprising:
   logic stored in a memory configured to service a Web request from a Web application operating on the server;
   logic, performed by one or more components of an operating system of the server, configured to detect an occurrence of an event in the servicing of the Web request, the logic forming part of a kernel trace session component of the operating system of the server, the logic configured to perform event buffering to detect an event when traces are processed by the kernel when the operating system processes a part of the Web request;

logic, performed by one or more components of the operating system of the server, configured to log a server entry in a server trace log, wherein the server entry comprises:
  information descriptive of the occurrence of the event of the servicing of the Web request; and
  a Web request Globally Unique Identifier (Web request GUID) corresponding to the Web request, wherein the Web request GUID is associated with the Web request, so that events which happen during servicing of the Web request can be identified by the Web request GUID which is logged with each of the events; and
logic, performed by one or more components of the operating system of the server, configured to log an application entry in an application trace log, wherein the application entry comprises:
  information descriptive of the occurrence of the event of the servicing of the Web request; and
  a Web request GUID corresponding to the Web request; and
logic configured to determine which of the information descriptive of the occurrence of the event to put into the server entry, the application entry, or both the server entry and the application entry, as a function of a predetermined level of verbosity, wherein the verbosity is determined by selecting one of a plurality of discrete indices, the indices corresponding to human-readable labels, wherein the descriptive information of the event comprises an event GUID and human readable text, and wherein event GUIDs may be correlated with Web request GUIDs.

30. The server module as defined in claim 29, further comprising logic configured to limit the entries in the server trace log that correspond to a predetermined said event that is selected from the group consisting of:
  the event occurs within the context of a predetermined URL;
  the event pertains of the functionality of authentication;
  the event pertains of the functionality of security;
  the event pertains of the functionality of compression;
  the event pertains of the functionality of a CGI; and
  the event pertains of the functionality of one or more filters.

31. The server module as defined in claim 29, wherein:
  the entry is logged in the server trace log during the servicing of the Web request only when the event pertains to a predetermined filter; and
  the information includes data going into the predetermined filter and data coming out of the predetermined filter.

* * * * *